United States Patent [19]

Peterson et al.

[11] Patent Number: 5,425,120
[45] Date of Patent: Jun. 13, 1995

[54] FRICTION FIT STRAIN RELIEF BOOT

[75] Inventors: Matthew A. Peterson, Elizabethtown; Thomas L. Christner, Middletown; Daniel E. Wertman, Mechanicsburg, all of Pa.

[73] Assignee: The Whitaker Corporation, Wilmington, Del.

[21] Appl. No.: 207,450

[22] Filed: Mar. 7, 1994

[51] Int. Cl.⁶ .................................................. G02B 6/36
[52] U.S. Cl. .................................... 385/87; 385/104; 385/81
[58] Field of Search .................. 385/87, 53, 62, 76, 385/81, 104

[56] References Cited

U.S. PATENT DOCUMENTS

| | | | |
|---|---|---|---|
| 4,813,760 | 3/1989 | Tanaka et al. | 350/96.21 |
| 4,930,856 | 6/1990 | Pelta | 385/87 |
| 5,062,683 | 11/1991 | Grois et al. | 385/87 |
| 5,151,962 | 9/1992 | Walker et al. | 385/78 X |
| 5,202,942 | 4/1993 | Collins et al. | 385/87 |

Primary Examiner—Frank Gonzalez
Assistant Examiner—Phan Thi Heartney Palmer
Attorney, Agent, or Firm—June B. Schuette

[57] ABSTRACT

A strain relief boot (10) in combination with a connector (15). The strain relief boot (10) has a body (11) having a rigid portion (12) and a flexible portion (13). A center bore (14) extends through the body (11) and the connector (15) is slidingly disposed in the center bore (14). The body (11) has an inner wall (20) surrounding the center bore (14). A plurality of spaced-apart ribs (21) are formed on the inner wall (20) of the rigid portion (12). Each rib (21) has a top surface (22) and a pair of adjoining sidewalls (23). The ribs (21) extend inwardly into the center bore (14) and grip the connector (15) with a friction fit, retaining the strain relief boot (10) on the connector (15).

11 Claims, 2 Drawing Sheets form
FRICTION FIT STRAIN RELIEF BOOT

FIELD OF THE INVENTION

The present invention relates to a strain relief boot for use with a connector and more particularly, to a strain relief boot which is removably retained on the connector by friction fit.

BACKGROUND ART

There is an effort under way in the industry to provide connectors for wiring that are approved by the Underwriters Laboratory. The connectors which are presently approved have strain relief boots which are attached to the connectors by an epoxy adhesive. Unfortunately, in the event of a fire, the epoxy adhesive burns with the production of noxious fumes. Furthermore, the use of an adhesive requires man hours to apply the adhesive and to assemble the system in addition to requiring curing time for the adhesive to harden. The cost of the adhesive is added to the labor costs. A further problem is that the epoxy adhesive produces an attachment which cannot be removed. U.S. Pat. No. 4,930,856 issued Jun. 5, 1990 to Pelta discloses a strain relief boot adhered to a connector with epoxy.

The applicants are also aware of snap fits and threaded means for attaching strain relief boots to connectors as in the following:

| Inventor(s) | U.S. Pat. No. | Date of Issue |
| --- | --- | --- |
| Tanaka et al | 4,813,760 | 03/01/1989 |
| Grois et al | 5,062,683 | 11/05/1991 |
| Collins et al | 5,202,942 | 04/13/1993 |

The strain relief boots disclosed in these references are complex, difficult to manufacture and require excessive time to assemble.

A need exists for a simple, easily manufactured strain relief boot which can be assembled rapidly, is cost effective, is removable and does not produce noxious fumes in the event of a fire.

SUMMARY OF THE INVENTION

It is an object of the present invention to provide a strain relief boot which can be assembled to a connector without the use of adhesive and which is removable.

It is a further object of the present invention to provide a strain relief boot which can be molded inexpensively and which can be joined to a connector in a cost efficient manner.

In accordance with the teachings of-the present invention, there is disclosed herein a strain relief boot in combination with a connector. The strain relief boot has a body with a rigid portion and a flexible portion. The body has a center bore extending therethrough. The connector is slidingly disposed in the center bore. The body has an inner wall. A plurality of spaced-apart ribs are formed on the inner wall of the rigid portion of the body. Each rib has a top surface and a pair of sidewalls. The ribs extend inwardly into the center bore. In this manner, the ribs grip the connector with a friction fit and retain the strain relief boot on the connector.

These and other objects of the present invention will become apparent from a reading of the following specification, taken in conjunction with the enclosed drawings.

DESCRIPTION OF THE PREFERRED EMBODIMENTS

Figure 1:
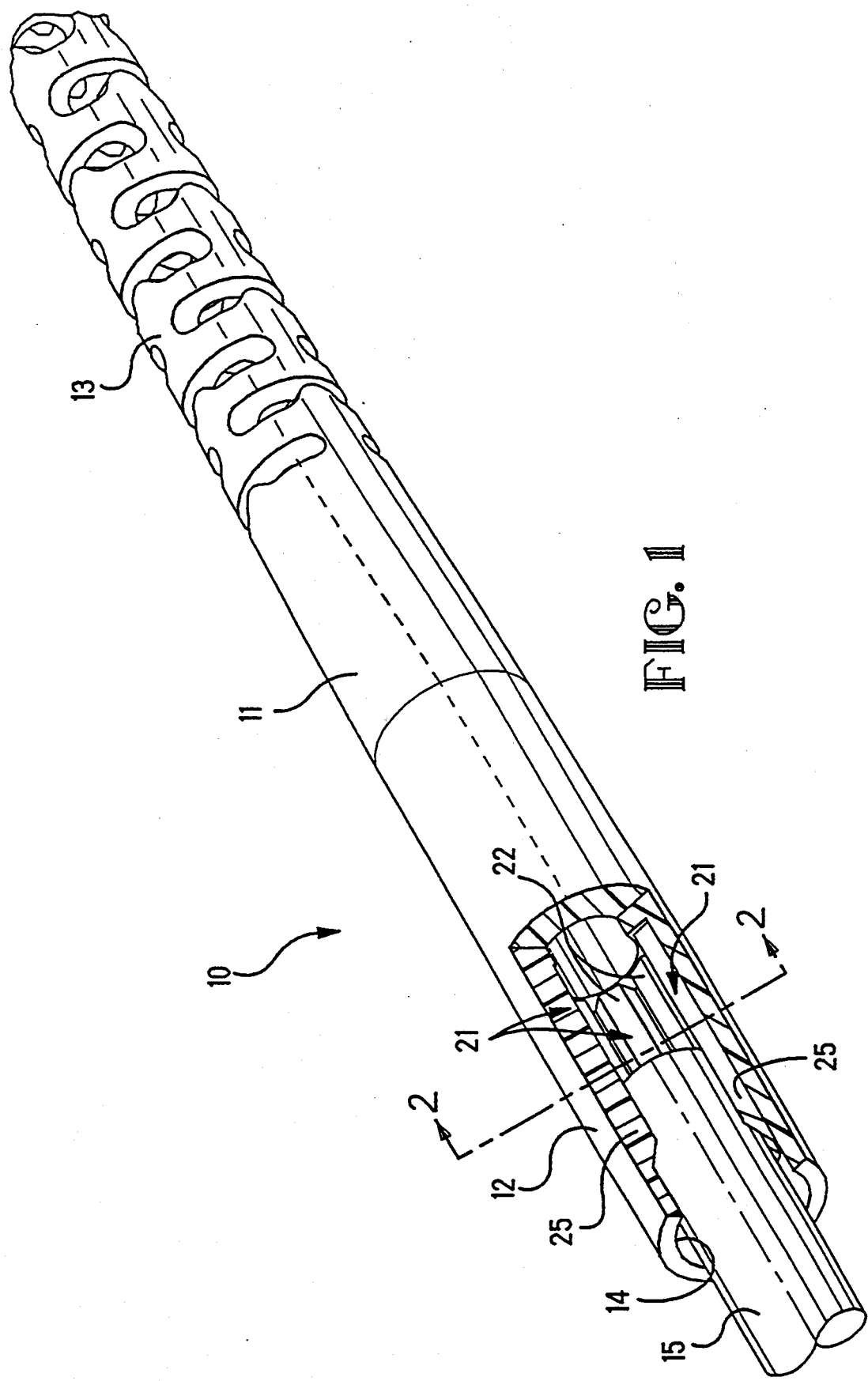
FIG. 1 is a perspective view showing the strain relief boot of the present invention attached to a connector.
Figure 2:
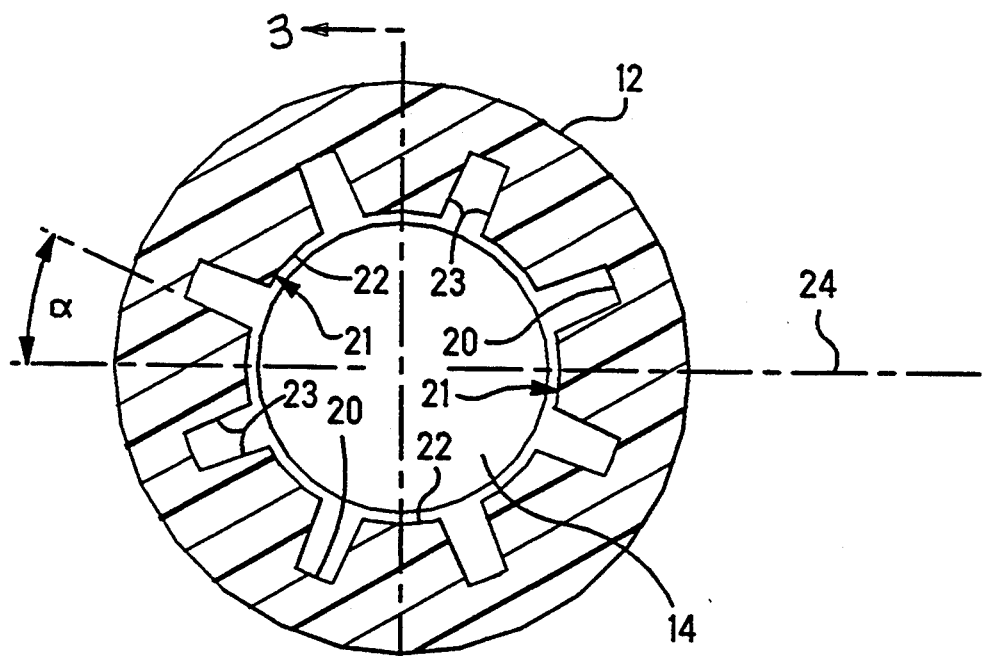
FIG. 2 is a cross-sectional view taken along the lines 22—2 of FIG. 1.
Figure 3:
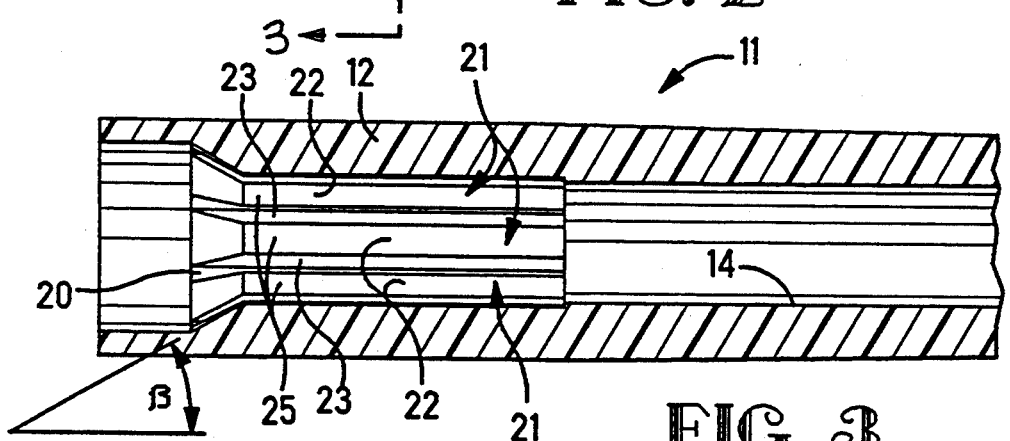
FIG. 3 is a cross-sectional view taken along the lines 33—3 of FIG. 2, the connector not being shown.
Figure 4:
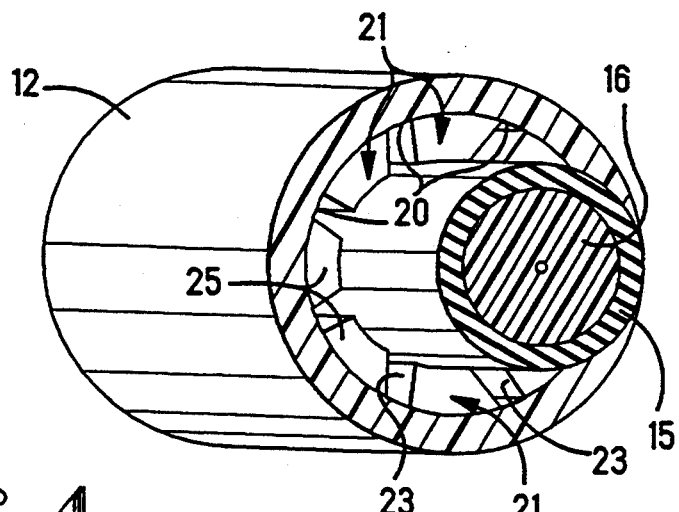
FIG. 4 is a perspective view showing the connector received in the strain relief boot.

Referring to FIGS. 1-4 the strain relief boot 10 has a body 11 which further has a rigid portion 12 contiguous with a flexible portion 13. The flexible portion 13 may have a plurality of openings formed therein, may have a plurality of fluted or hinged segments or other means to provide flexibility. A center bore 14 is formed in the body 11 and extends throughout the length of the body. A connector 15 maybe for electrical or optical use and the strain relief boot 10 provides mechanical support for the connector 15 to reduce the possibility of damage to the connector 15 or cable 16. The connector 15 may have an eyelet or other portion which is slidingly received in the center bore 14 of the strain relief boot 10. The body 11 has an inner wall 20 which surrounds the center bore 14.

A plurality of ribs 21 are formed on the inner wall 20 of the rigid portion 12 of the body 11. The ribs 21 are spaced apart from one another and extend inwardly into the center bore 14. It is preferred that there be eight ribs 21 although a greater or a lesser number of ribs 21 may be formed. For improved gripping of the connector 15, it is preferred that pairs of ribs 21 be formed opposing one another. The choice of the number of ribs 21 is a function of the ease of manufacture of the ribs and the tooling to form the strain relief boot. Another consideration in determining the number of ribs 21 is to provide for the strain relief boot 10 to be centered geometrically on the connector 15. Each rib 21 has a top surface 22 and a pair of adjoining sidewalls 23. Each sidewall 23 extends from the top surface 22 of each rib 21 to the inner wall 20 of the rigid portion 12 of the body 11. Each rib 21 is disposed in a plane 24, the plane 24 bisects the body 11, passing through the center point of the body 11. The plane 24 also bisects the respective rib 21. Each sidewall 23 of each rib 21 is chamfered at an angle $\alpha$ of approximately 20°-30° with respect to the plane 24 of the respective rib 21. An angle $\alpha$ of 25° is preferred to obtain uniform compression on the connector 15. The top surface 22 of each rib 21 may be arcuate to more nearly conform to the cylindrical form of the connector 15 and to assure improved contact between the respective ribs 21 and the connector 15. The friction fit between the top surface 22 of the ribs 21 and the connector 15 is sufficient to retain the strain relief boot 10 on the connector 15 while permitting ease of assembly of the components. The ribs 21 are circumferentially spaced substantially parallel to one another and extend longitudinally on the inner wall 10 of the rigid portion 12 of the body 11 from near the end of the rigid portion 12 toward the flexible portion 13. Each rib 21 has a first end 24 which is distal from the flexible portion 13 of the body 11. Each first end 24 is tapered from the inner wall 20 toward the top surface 22 of the respective rib 21 at an angle $\beta$ of approximately 30°. In this manner, when the connector 15 is slidingly disposed into the rigid portion 12 of the body 11 (FIGS. 1 and 4) the connector 15 initially contacts the tapered first ends 24 of the ribs 21 and sliding disposition of the connector 15 is facilitated.

The friction fit of the strain relief boot 10 on the connector 15 due to the contact of the connector 15 with the plurality of ribs 21, permits the removal of the strain relief boot 10 from the connector 15. When required, the mated connector 15 and strain relief boot 10 may be pulled apart without using undue force so that the members are not damaged. In this manner, the present invention provides versatility not possible with strain relief boots of the prior art which were joined with epoxy adhesive. In the event of a fire, the present invention also avoids the generation of noxious fumes produced by the combustion of epoxy adhesive.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A strain relief boot in combination with a connector, the strain relief boot comprising a body having a rigid portion and a flexible portion, the body having a center bore extending therethrough, the connector being slidingly disposed in the center bore, the body having an inner wall surrounding the center bore, a plurality of spaced-apart ribs formed on the inner wall, each rib having a top surface and a pair of adjoining sidewalls, the ribs extending inwardly into the center bore, wherein the ribs grip the connector with a friction fit and retain the strain relief boot on the connector.

2. The strain relief boot of claim 1, wherein the ribs are circumferentially spaced approximately parallel to one another and extend longitudinally on the inner wall of the rigid portion of the body.

3. The strain relief boot of claim 2, wherein the ribs are equally spaced.

4. The strain relief boot of claim 1, wherein the ribs are disposed in pairs opposite of one another.

5. The strain relief boot of claim 1, wherein each rib is disposed in a plane, the plane bisecting the body and bisecting the respective rib, each sidewall being chamfered at an acute angle with respect to the bisecting plane.

6. The strain relief boot of claim 5, wherein the acute angle is approximately 20°–30°.

7. The strain relief boot of claim 6, wherein the acute angle is 25°.

8. The strain relief boot of claim 1, wherein the top surface of each rib is arcuate.

9. The strain relief boot of claim 1, wherein the strain relief boot is removable from the connector.

10. A strain relief boot in combination with a connector, the strain relief boot comprising a body having a rigid portion and a flexible portion, the body having a center bore extending therethrough, the connector being slidingly disposed in the center bore, the body having an inner wall surrounding the center bore, a plurality of spaced-apart ribs formed on the inner wall, each rib having a top surface and a pair of adjoining sidewalls, the ribs extending inwardly into the center bore, wherein the ribs grip the connector with a friction fit and retain the strain relief boot on the connector and further comprising each rib having a first edge, each first edge being distal from the flexible portion, each first edge being tapered at an acute angle from the inner wall toward the top surface of the respective rib, wherein sliding disposition of the connector into the strain relief boot is facilitated.

11. The strain relief boot of claim 10, wherein the acute angle is approximately 30°.

* * * * *